(12) United States Patent
Lee

(10) Patent No.: US 8,235,397 B2
(45) Date of Patent: Aug. 7, 2012

(54) EXERCISE BICYCLE WITH AN ECCENTRIC WHEEL

(76) Inventor: David Lee, Pingtung County (TW)

(*) Notice: Subject to any disclaimer, the term of this patent is extended or adjusted under 35 U.S.C. 154(b) by 0 days.

(21) Appl. No.: 13/189,989

(22) Filed: Jul. 25, 2011

(65) Prior Publication Data

US 2012/0161415 A1   Jun. 28, 2012

(30) Foreign Application Priority Data

Dec. 28, 2010  (TW) .............................. 99225162 U

(51) Int. Cl.
*B62M 1/20* (2006.01)
*B62M 1/18* (2006.01)

(52) U.S. Cl. ...................... 280/1.191; 280/218; 280/220; 280/229

(58) Field of Classification Search ............... 280/1.191, 280/220, 221, 200, 210, 218, 223; 482/96
See application file for complete search history.

(56) References Cited

U.S. PATENT DOCUMENTS

| | | | |
|---|---|---|---|
| 1,616,839 A * | 2/1927 | Arleigh | 280/218 |
| 1,679,819 A * | 8/1928 | Fageol | 280/229 |
| 4,201,396 A * | 5/1980 | Gessi | 280/229 |
| 4,669,746 A * | 6/1987 | Wu | 280/221 |
| 5,120,074 A * | 6/1992 | Herman et al. | 280/220 |
| 5,273,503 A * | 12/1993 | Hershey | 482/96 |
| 6,880,848 B2 * | 4/2005 | Liu | 280/287 |
| 2002/0067018 A1* | 6/2002 | Shaw | 280/220 |

FOREIGN PATENT DOCUMENTS

| TW | 579980 U | * 3/2004 |
|---|---|---|
| TW | 200838762 A | * 10/2008 |
| TW | I332459 | 11/2010 |

* cited by examiner

*Primary Examiner* — Lesley D. Morris
*Assistant Examiner* — Daniel Yeagley
(74) *Attorney, Agent, or Firm* — Muncy, Geissler, Olds & Lowe, PLLC

(57) ABSTRACT

An exercise bicycle with an eccentric wheel includes a cushioning body and an elastic driving device. The cushioning body includes a front frame, a rear frame, a pivot, and a suspension. The front frame has a handlebar, a front wheel and a saddle. The rear frame has a fixed portion and an eccentric rear wheel. The pivot is disposed between the front frame and the rear frame. The suspension is connected to the front frame and the rear frame. The elastic driving device is mounted in the fixed portion of the rear frame and has two casing pipes, two springs, two upper pedals, two pedal assemblies, and a connecting board. The exercise bicycle allows a user pumping the elastic driving device up and down as horse-riding to achieve an exercising purpose.

2 Claims, 5 Drawing Sheets

FIG. 2

EXERCISE BICYCLE WITH AN ECCENTRIC WHEEL

BACKGROUND OF THE INVENTION

1. Field of the Invention

The present invention relates to a bicycle, and more particularly to an exercise bicycle with an eccentric wheel.

2. Description of Related Art

A conventional exercise bicycle with an eccentric wheel, as shown in Applicant's issued Taiwan Patent No. 1332459, which includes a front fork mounted on front part of a frame and a rear fork mounted on a rear part of the frame. A handlebar is mounted on a top of the front fork. A front wheel is rotatably mounted on a bottom of the front fork. An eccentric rear wheel is rotatably mounted on a bottom of the rear fork. An elastic seat device is mounted between a bottom of a seat tube and a positioning rod of a middle of the frame. The elastic seat device includes springs and a seat cushion to provide a cushioning function for a rider's hip. An elastic pedaling device is mounted in the middle part of the frame and includes a positioning portion, two cannulas, and two spindles. The positioning portion is fixed on the frame. The two cannulas are respectively disposed on two sides of the positioning portion. The two spindles are respectively longitudinally inserted into the cannulas. Each spindle extends out from the sleeve and has a pedal mounted on a part of the spindle extending out from the sleeve. Each spindle has a spring sleeved on the spindle and a nut screwed with the spindle. Each spring has two ends respectively abutting against the nut and an inner bottom of the cannula.

When a rider rides the conventional exercise bicycle and treads the pedals, the eccentric rear wheel is rotated relative to a pivot of the frame to generate an eccentric twisting torque for forcing a rotation of the eccentric rear wheel, such that the conventional exercise bicycle can provide an exercise liking horse-riding.

However, the frame of the conventional exercise bicycle greatly differs from a normal bicycle frame and cannot be utilized on the normal bicycle frame.

To overcome the shortcomings, the present invention tends to provide an exercise bicycle to mitigate or obviate the aforementioned problems.

SUMMARY OF THE INVENTION

The main objective of the invention is to provide an exercise bicycle with an eccentric wheel includes a cushioning body and an elastic driving device mounted in the cushioning body.

The cushioning body includes a front frame, a rear frame, a pivot, and a suspension.

The front frame is disposed on a front end of the cushioning frame and has a handlebar, a front wheel and a saddle. The handlebar is rotatably mounted on a front end of the front frame. The front wheel is rotatably mounted on a bottom of the handlebar. The saddle is mounted on a rear end of the front frame.

The rear frame is disposed on a rear end of the cushioning frame and has a fixed portion and an eccentric rear wheel. The fixed portion is disposed on a front end of the rear frame. The eccentric rear wheel is eccentrically mounted on a rear end of the rear frame.

The pivot is disposed between the front frame and the rear frame and located in front of the fixed portion for pivotally connecting the front frame with the rear frame.

The suspension is connected to the front frame and the rear frame.

The elastic driving device is mounted in the fixed portion of the rear frame and has two casing pipes, two springs, two upper pedals, two pedal assemblies, and a connecting board.

The two casing pipes are respectively fixed on two sides of the fixed portion of the rear frame, and each casing pipe has a connecting portion disposed on a side of the casing pipe for fixing the casing pipe on one of the two sides of the fixed portion.

The two springs are respectively received in the two casing pipes, and each spring has a bottom end abutting against an inner bottom of one of the casing pipes.

The two upper pedals are respectively mounted on two tops of the two casing pipes.

The two pedal assemblies are respectively mounted on the two casing pipes. Each pedal assembly has a spindle inserted into one of the casing pipes and the spring that is received in the casing pipe. Each spindle has a spindle nut mounted on a top of the spindle for abutting against a top of one of the springs.

The connecting board is disposed under the fixed portion of the rear frame and connects the two spindles of the two pedal assemblies.

The exercise bicycle of the present invention can be utilized on a conventional cushioning bicycle frame. The conventional cushioning bicycle frame can be modified to a structure having a front frame elastically pivoted relative to a rear frame and an elastic driving device to accomplish the exercise bicycle of the present invention. The exercise bicycle allows a rider holding the handlebar and stepping on the two upper pedals located on two side of the cushioning body, such that the rider can pump the elastic driving device up and down, and the front frame can be elastically pivoted relative to the rear frame to force the exercise bicycle of the present invention moving forward. When the rider can pump the elastic driving device up and down as riding a horse, the rider needs to exercise whole body's muscles to achieve an exercising purpose.

Other objects, advantages and novel features of the invention will become more apparent from the following detailed description when taken in conjunction with the accompanying drawings.

BRIEF DESCRIPTION OF THE DRAWINGS

FIG. 2 is an exploded perspective view of an elastic driving device of the exercise bicycle in FIG. 1;

DETAILED DESCRIPTION OF PREFERRED EMBODIMENT

Figure 1:
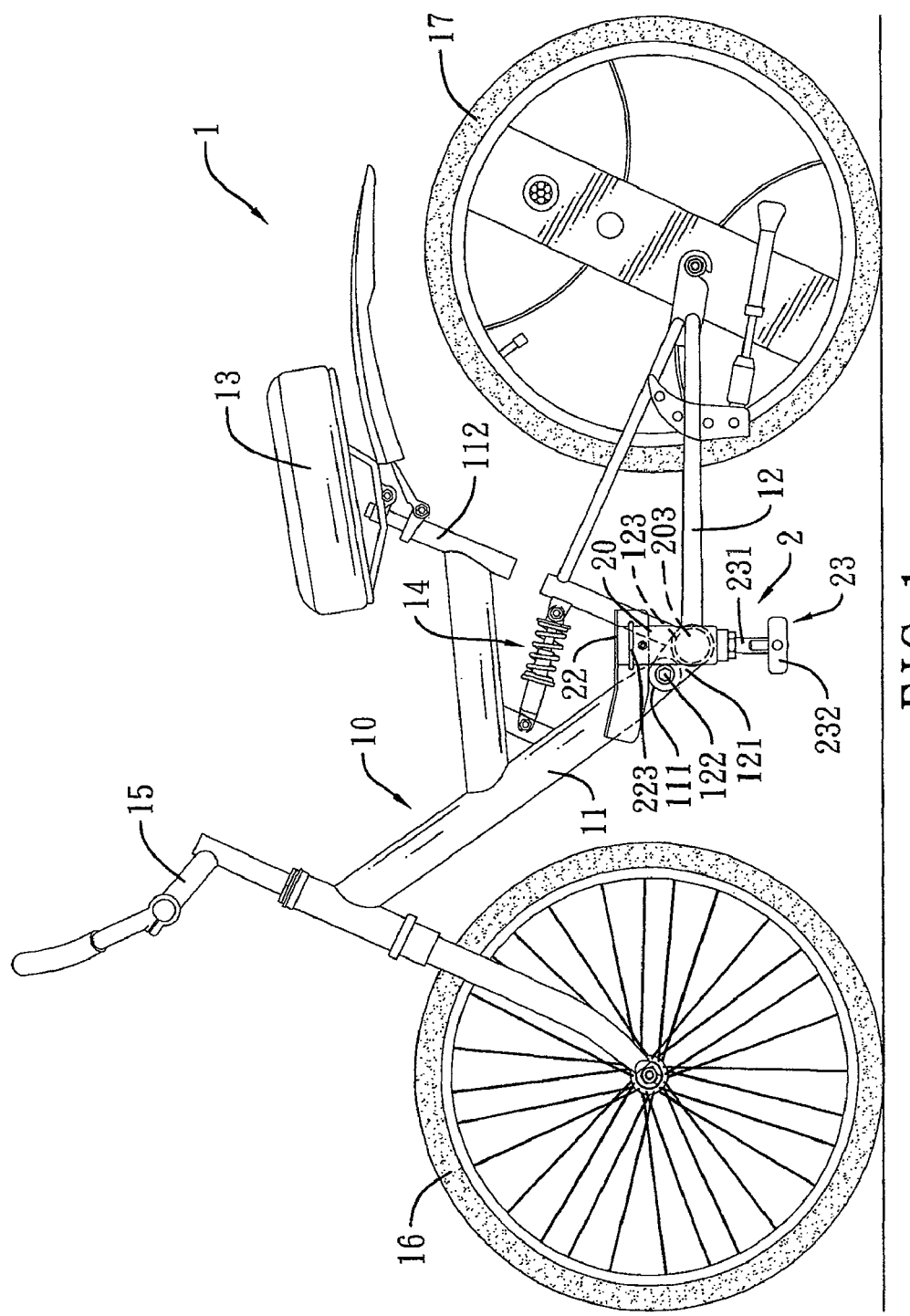
FIG. 1 is a side view of an exercise bicycle with an eccentric wheel in accordance with the present invention.

With reference to FIG. 1, an exercise bicycle with an eccentric wheel in accordance with the present invention comprises a cushioning body 1 and an elastic driving device 2 mounted in the cushioning body 1.

The cushioning body 1 includes a cushioning frame 10, a front wheel 16, and an eccentric rear wheel 17. The cushioning frame 10 includes a front frame 11, a rear frame 12, a saddle 13, a pivot 122, and a suspension 14.

The front frame 11 is disposed on a front end of the cushioning frame 10, and has a steerable handlebar 15, a seat tube 112, and a first pivot portion 111. The handlebar 15 is disposed on a front end of the front frame 11. The front wheel 16 is rotatably mounted on a bottom of the handlebar 15. The seat tube 112 is disposed on a rear end of the front frame 11. The saddle 13 is mounted on the seat tube 112.

The rear frame 12 is disposed on a rear end of the cushioning frame 10, and has a pair of second pivot portions 121 and a fixed portion 123. The eccentric rear wheel 17 is eccentrically mounted on a rear end of the rear frame 12. The pair second pivot portions 121 are respectively disposed on two sides of a front end of the rear frame 12. The fixed portion 123 is disposed on the front end of the rear frame 12 and is located at a rear of the second pivot portions 121 for assembling with the elastic driving device 2.

The pivot 122 is disposed between the front frame 11 and the rear frame 12, and is located in front of the fixed portion 123 for pivotally connecting the pair of the second pivot portions 121 of the rear frame 12 with two sides of the first pivot portion 111 of the front frame 11.

The suspension 14 is a coil-spring type of shock absorber. The suspension 14 has two ends respectively connected to the front frame 11 and the rear frame 12, is located below the seat tube 112 of the front frame 11, and is located above the fixing portion 123 of the rear frame 12. When the front frame 11 is pivoted relative to the rear frame 12 as a fulcrum of the pivot 122, the suspension 14 is compressible to provide a restitution force for repositioning the front frame 11 relative to the rear frame 12.

Figure 2:
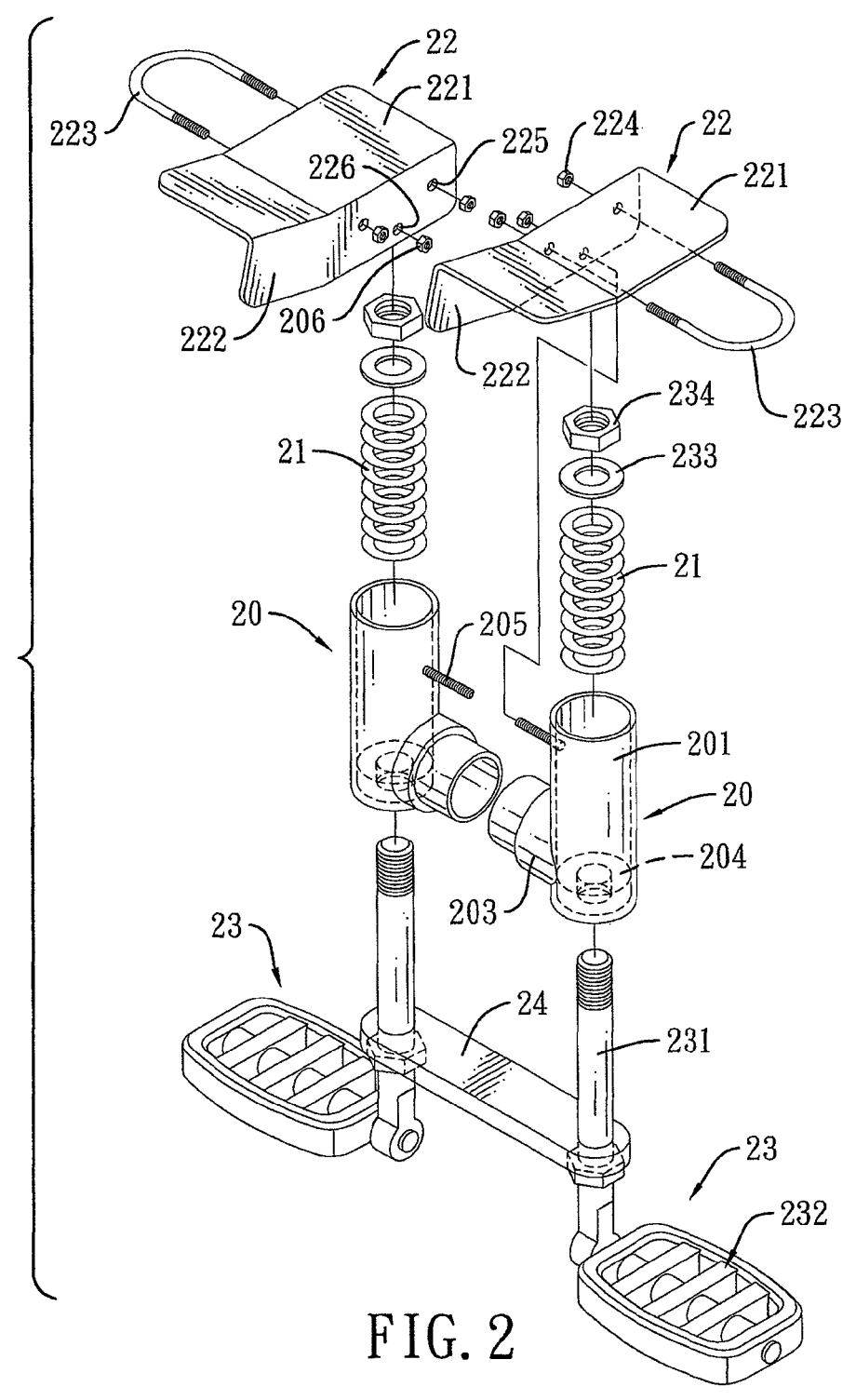
Figure 3:
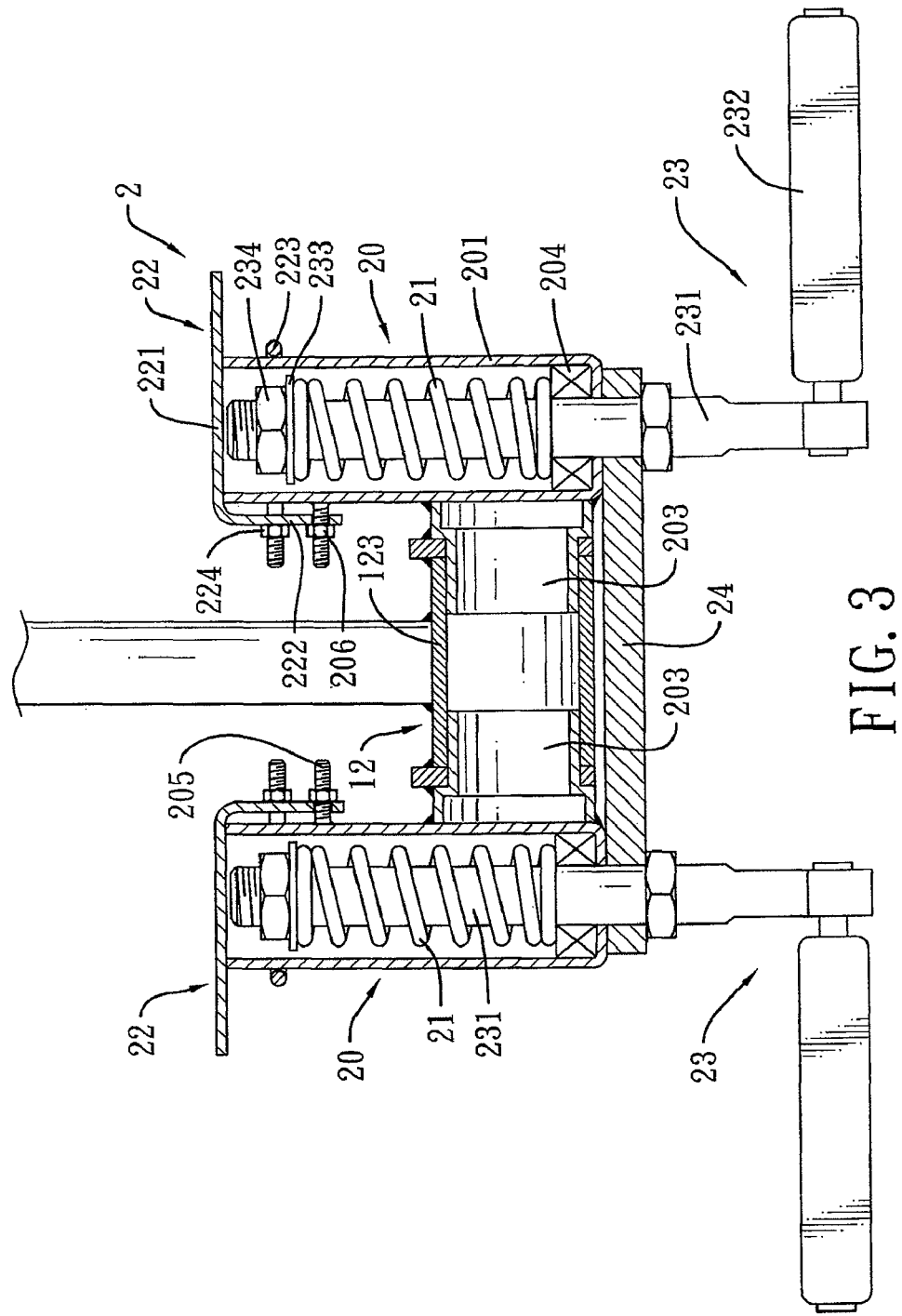
FIG. 3 is a side view in partial section of the elastic driving device of the exercise bicycle in FIG. 1.

With reference to FIGS. 1 to 3, the elastic driving device 2 is mounted in the fixed portion 123 of the rear frame 12 and includes two casing pipes 20, two springs 21, two upper pedals 22, two pedal assemblies 23, and a connecting board 24.

Each casing pipe 20 has a casing body 201. The casing body 201 of each casing pipe 20 has a through hole, a connecting portion 203, a bolt 205 and a nut 206. The through hole is longitudinally defined through the casing body 201. The connecting portion 203 is disposed on a side of the casing body 201 for fixing the casing pipe 20 on one of the two sides of the fixing portion 123. The bolt 205 extends from a side surface of the casing body 201 and the nut 206 is screwed with the bolt 205. The two bolts 205 of the two casing bodies 201 extend toward each other.

Each spring 21 is received in the through hole of one of the casing bodies 201, and has a bottom end abutting against an inner bottom 204 of the casing body 201.

The two upper pedals 22 are respectively mounted on two tops of the two casing bodies 201 and respectively located on two sides of the rear frame 12. Preferably, each upper pedal 22 includes a lateral board 221, a side board 222, an U-shaped hook 223, and two nuts 224. The side board 222 extends downward from one end of the lateral board 221 such that the side board 222 is substantially perpendicular to the lateral board 221. Each side board 222 has two orifices 225 defined through the side board 222, and a fixing hole 226 defined through the side board 222 and located lower than the two orifices 225 for receiving the bolt 205 of one of the casing body 201, such that the fixing hole 226 and the orifices 225 are arranged as a triangle. Each U-shaped hook 223 has two threaded free ends extending from the U-shaped hook 223.

The two threaded free ends of the U-shaped hook 223 of one of the upper pedals 22 are inserted through the two orifices 225 of the side board 222 of the upper pedal 22 and are screwed with the two nuts 224 for fixing the upper pedal 22 on a corresponding casing pipe 20, and the bolt 205 of the casing bodies 201 of the casing pipe 20 is inserted through the fixing hole 226 and is screwed with the nut 206 to further fix the upper pedal 22 on the casing pipe 20, such that the upper pedal 22 is firmly fixed on a corresponding casing body 201.

The two pedal assemblies 23 are respectively mounted on the two casing pipes 20. Each pedal assembly 23 includes a spindle 231 and a pivotal pedal 232 pivotally connecting to a bottom of the spindle 231. Each spindle 231 is inserted into one of the casing bodies 201 and the spring 21 that is received in the casing body 201. Each spindle 231 has a threaded end disposed on a top of the spindle 231, a washer 233 sleeved on the spindle 231 and abutting against a top of one of the springs 21, and a spindle nut 234 screwed with the thread end of the spindle 231. Each pivotal pedal 232 extends from a side surface of the spindle 231 such that the pivotal pedal 232 is substantially perpendicular to the spindle 231.

Preferably, each casing body 201 further has a sliding bearing 204 for reducing a friction between the casing body 201 and the spindle 231 such that the spindle 231 of a corresponding one of the pedal assemblies 23 is slidable in the casing body 201.

The connecting board 24 is disposed under the fixed portion 123 of the rear frame 12 and connects the two spindles 231 of the two pedal assemblies 23. Preferably, the connecting board 24 has two connecting holes respectively defined through two ends of the connecting board 24 for respectively receiving the two spindles 231 and respectively mounted securely around the spindles 231, such that the two pedal assemblies 23 are moved together and simultaneously operated.

Figure 4:
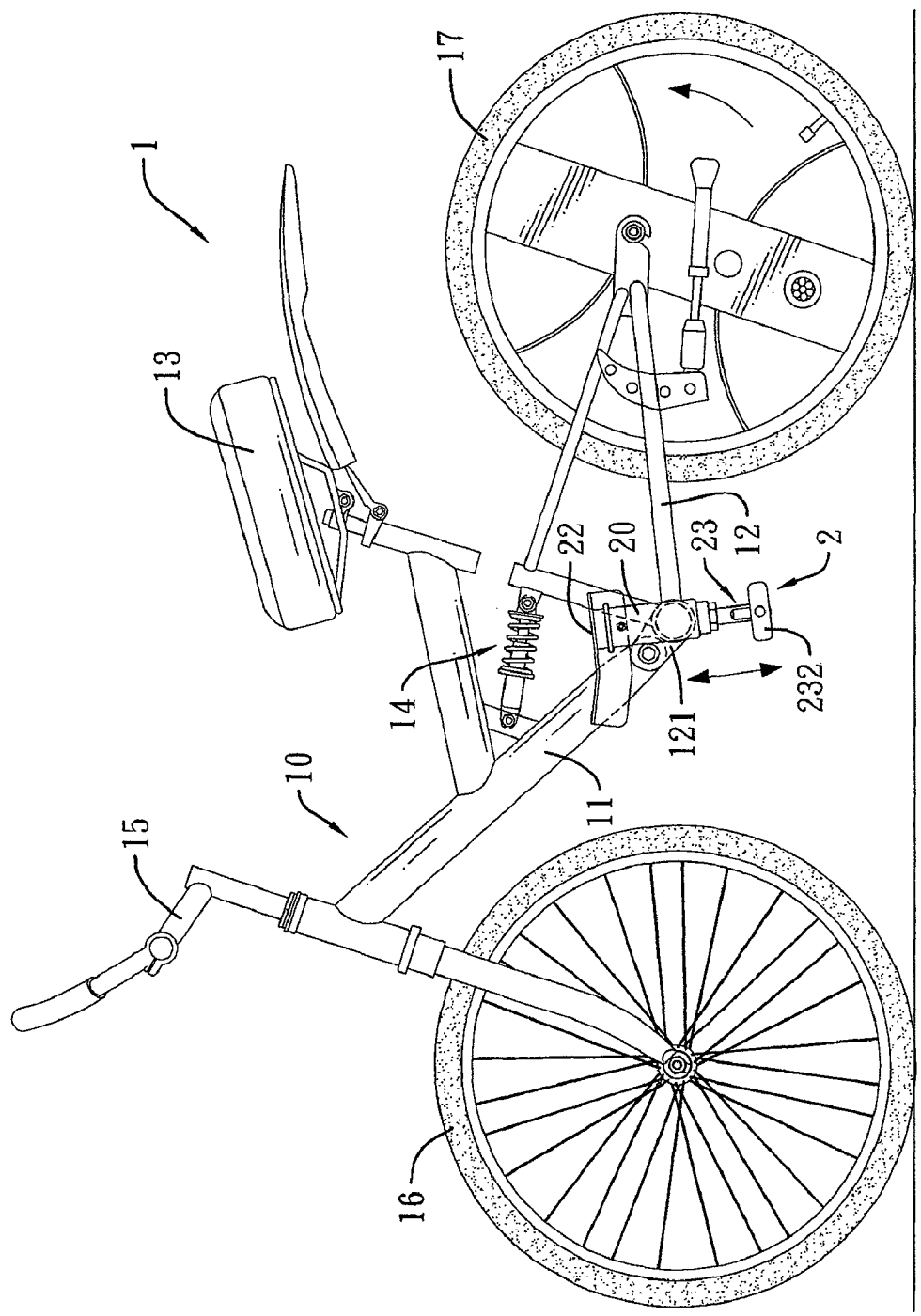
FIG. 4 is an operational side view of the exercise bicycle in FIG. 1.
Figure 5:
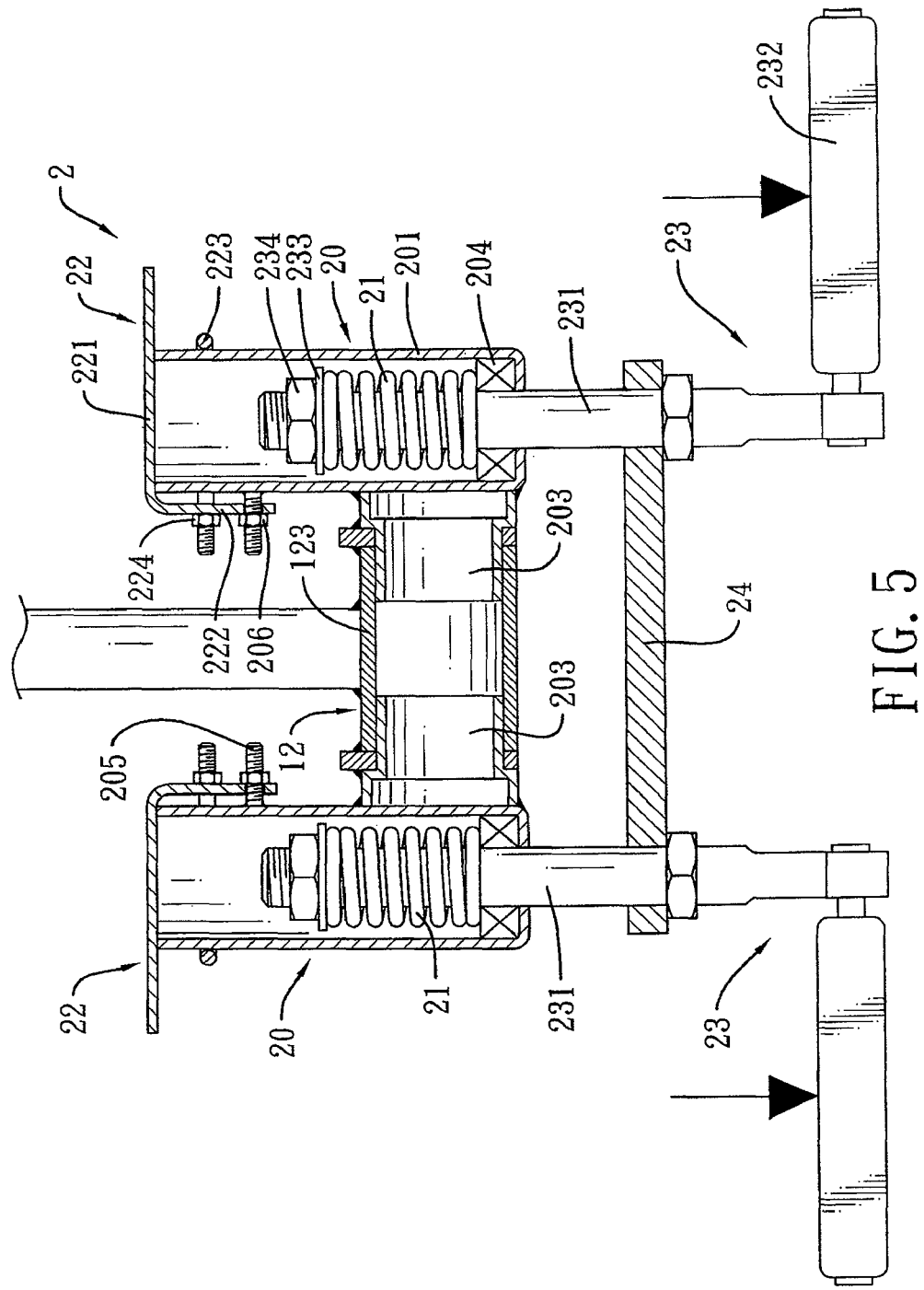
FIG. 5 is an operational side view in partial section of the elastic driving device of the exercise bicycle in FIG. 3.

With reference to FIGS. 4 and 5, a rider can hold the handlebar 15 and step on the two upper pedals 22 or the two pivotal pedals 232 located on two side of the cushioning body 1, such that the rider can pump the elastic driving device 2 up and down. When the handlebar 15 is pulled backward and the elastic driving device 2 is compressed downward, the front frame 11 is pivoted relative to the rear frame 12 as the fulcrum of the pivot 122, such that the suspension 14 is compressed. Then the suspension 14 is restored to provide the restitution force for repositioning the front frame 11 relative to the rear frame 12. In the meanwhile, the handlebar 15 is pulled forward, and the elastic driving device 2 is restored and provides a restitution force to spread the front frame 11 relative to the rear frame 12. During the repeated movement as above described, the movement provides a torque to the eccentric rear wheel 17 and forces the eccentric rear wheel 17 eccentrically rotated, such that the exercise bicycle of the present invention is moved forward and provides the rider with a riding way as horse-riding. When the rider can pump the elastic driving device 2 up and down, the rider needs to exercise whole body's muscles to achieve an exercising purpose.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An exercise bicycle comprising:
    a cushioning body having a front frame disposed on a front end of a cushioning frame, and having
- a handlebar rotatably mounted on a front end of the front frame;
- a front wheel rotatably mounted on a bottom of the handlebar; and
- a saddle mounted on a rear end of the front frame; and a rear frame disposed on a rear end of the cushioning frame, and having
- a fixed portion disposed on a front end of the rear frame; and
- an eccentric rear wheel eccentrically mounted on a rear end of the rear frame; and a pivot disposed between the front frame and the rear frame, and located in front of the fixed portion for pivotally connecting the front frame with the rear frame; and a suspension connected to the front frame and the rear frame; and an elastic driving device mounted in the fixed portion of the rear frame and having
- two casing pipes respectively fixed on two sides of the fixed portion of the rear frame, each casing pipe having a connecting portion disposed on a side of the casing pipe for fixing the casing pipe on one of the two sides of the fixed portion;
- two springs respectively received in the two casing pipes, and each spring having a bottom end abutting against an inner bottom of one of the casing pipes;
- two upper pedals respectively mounted on two tops of the two casing pipes; and
- two pedal assemblies respectively mounted on the two casing pipes, and each pedal assembly having
  - a spindle inserted into one of the casing pipes and the spring received in the casing pipe, and having a spindle nut mounted on a top of the spindle for abutting against a top of the spring; and
- a connecting board disposed under the fixed portion of the rear frame and connecting the two spindles of the two pedal assemblies.

2. The exercise bicycle as claimed in claim 1, wherein each upper pedal has
- a lateral board; and
- a side board extending downward from one side of the lateral board and having
  - two orifices defined through the side board; and
  - a fixing hole defined through the side board and located lower than the two orifices, such that the fixing hole and the orifices are arranged as a triangle; and
- a U-shaped hook having two threaded free ends respectively inserted into the two orifices; and
- two nuts respectively screwed with the two threaded free ends of the U-shaped hook for fixing the upper pedal on one of the two casing pipes; and each casing pipe has
- a bolt extending from a side surface of the casing pipe and inserting into the fixing hole of one of the two upper pedals; and
- a nut screwing on the bolt to further fix one of the two upper pedal on the casing pipe.

* * * * *